United States Patent
Kim et al.

(10) Patent No.: US 11,784,906 B2
(45) Date of Patent: Oct. 10, 2023

(54) SYSTEM-LATENCY-AWARE DISPLAY DEVICE

(71) Applicant: NVIDIA CORPORATION, Santa Clara, CA (US)

(72) Inventors: Joohwan Kim, San Jose, CA (US); Benjamin Boudaoud, Efland, NC (US); Josef B. Spjut, Durham, NC (US); Morgan S. McGuire, Waterloo (CA); Seth P. Schneider, San Jose, CA (US); Rouslan L. Dimitrov, Santa Clara, CA (US); Lars Nordskog, Corte Madera, CA (US); Cody J. Robson, San Jose, CA (US); Sau Yan Keith Li, San Jose, CA (US); Gerrit Ary Slavenburg, Hayward, CA (US); Tom J. Verbeure, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 16/893,327

(22) Filed: Jun. 4, 2020

(65) Prior Publication Data
US 2021/0243101 A1    Aug. 5, 2021

Related U.S. Application Data

(60) Provisional application No. 63/029,343, filed on May 22, 2020, provisional application No. 62/970,096, filed on Feb. 4, 2020.

(51) Int. Cl.
*H04L 43/106* (2022.01)
*H04L 43/0852* (2022.01)
(Continued)

(52) U.S. Cl.
CPC .............. *H04L 43/106* (2013.01); *G06F 3/14* (2013.01); *G06T 1/20* (2013.01); *G09G 5/14* (2013.01);
(Continued)

(58) Field of Classification Search
CPC ..... H04L 43/106; H04L 43/0852; G06F 3/14; G06T 1/20; G09G 5/14; G09G 2340/0407
See application file for complete search history.

(56) References Cited

U.S. PATENT DOCUMENTS

2011/0211049 A1* 9/2011 Bassali ................ H04N 13/327
                                                              348/51
2013/0279338 A1    10/2013 Mehrotra et al.
(Continued)

FOREIGN PATENT DOCUMENTS

| CN | 102158728 A | 8/2011 |
| CN | 103680368 A | 3/2014 |
| TW | 201429251 A | 7/2014 |

OTHER PUBLICATIONS

"VDI click to photon with raspberry-pi," NVIDIA Developer Forums, 2016, retrieved on Dec. 28, 2020 from https://forums.developer.nvidia.com/t/vdi-click-to-photon-with-raspberry-pi/162237, 12 pages.
(Continued)

*Primary Examiner* — Sahlu Okebato
(74) *Attorney, Agent, or Firm* — Artegis Law Group, LLP

(57) ABSTRACT

A display device for measuring the end-to-end latency of a computing system. The computing system includes an input device, a computing device, and the display device. The display device is directly connected with the input device and receives input data packets generated by the input device in response to received user input events. The display device passes the input packets to the computing device for graphics processing. The display device measures the end-to-end latency comprising the sum of three latencies. A first
(Continued)

latency comprises an input delay of the input device. A second latency comprises an amount of time between generation of the input packet and a corresponding change in pixel values caused by the input event at the display device. A third latency comprises a display latency. The display device also displays latency information associated with the measured end-to-end latency.

20 Claims, 7 Drawing Sheets

(51) Int. Cl.
    *G06F 3/14*     (2006.01)
    *G09G 5/14*     (2006.01)
    *G06T 1/20*     (2006.01)

(52) U.S. Cl.
    CPC . *H04L 43/0852* (2013.01); *G09G 2340/0407* (2013.01)

(56) References Cited

U.S. PATENT DOCUMENTS

| | | | | |
|---|---|---|---|---|
| 2014/0085459 | A1* | 3/2014 | Blanton | H04N 17/04 348/135 |
| 2015/0084979 | A1* | 3/2015 | Bidarkar | G06F 3/14 345/593 |
| 2016/0180811 | A1* | 6/2016 | Colenbrander | A63F 13/30 356/402 |
| 2018/0068640 | A1* | 3/2018 | Martin | G06K 9/0061 |
| 2019/0098293 | A1* | 3/2019 | Lee | H04N 17/04 |
| 2019/0321725 | A1* | 10/2019 | Zimring | A63F 13/358 |
| 2020/0301814 | A1* | 9/2020 | Phaneuf | A63F 13/355 |

OTHER PUBLICATIONS

Young, D., "NVIDIA GRID Days 2016 Recap, Key Takeaways, Technical Deep Dive and Lessons Learned!", ITVCE.com, Mar. 7, 2016, retrieved on Dec. 28, 2020 from http://blog.itvce.com/2016/03/07/nvidia-grid-days-2016-recap-key-takeaways-technical-deep-dive-and-lessons-learned/, 26 pages.

Johnsen, M., "How to use Click-to-Photon to measure End to End latency," Virtual Experience, Mar. 7, 2016, retrieved on Dec. 28, 2020, from https://web.archive.org/web/20190516221213/https://www.virtualexperience.no/2016/03/07/how-to-use-click-to-photon-to-measure-end-to-end-latency/, 3 pages.

Casiez et al., "Looking through the Eye of the Mouse: A Simple Method for Measuring End-to-end Latency using an Optical Mouse," UIST '15, Nov. 2015, Chariotte, United States, pp. 629-636, 10.1145/2807442.2807454, hal-01226729, retrieved Dec. 28, 2020 from https://hal-enac.archives-ouvertes.fr/hal-01226729/document.

"Video Signal Input Lag Tester," Leo Bodnar Electronics, retrieved on Dec. 28, 2020 from http://www.leobodnar.com/shop/index.php?main_page=product_info&cPath=89&products_id=212, 3 pages.

Spence, C. "Audiovisual multisensory integration," Acoustical Science and Technology, 28 (2), 2007, pp. 61-70, retrieved on Dec. 28, 2020 from https://www.jstage.jst.go.jp/article/ast/28/2/28_2_61/_pdf.

* cited by examiner

Figure 3

| 251 | |
|---|---|
| 311 | Estimated first latency |
| 312 | Measured first latency; decoded input packet information |
| 321 | Prior pixel values: average luminance value, average R value, average G value, average B value |
| 322 | First timestamp |
| 323 | New pixel values: average luminance value, average R value, average G value, average B value |
| 324 | Second timestamp; threshold degree (X%) |
| 325 | Measured second latency |
| 331 | Estimated third latency |
| 340 | Total end-to-end latency |

310: {311, 312}
320: {321, 322, 323, 324, 325}
330: {331}

SYSTEM-LATENCY-AWARE DISPLAY DEVICE

CROSS-REFERENCE TO RELATED APPLICATIONS

This application claims the priority benefit of the United States provisional patent application titled, "System-Latency-Aware Displays," filed on Feb. 4, 2020 and having Ser. No. 62/970,096, and claims the priority benefit of the United States provisional patent application titled, "System-Latency-Aware Displays," filed on May 22, 2020 and having Ser. No. 63/029,343. The subject matter of these related applications is hereby incorporated herein by reference.

BACKGROUND

Field of the Various Embodiments

The various embodiments relate generally to display devices and display technology and, more specifically, to a system-latency-aware display device.

Description of the Related Art

The general performance of a computer system under test can be measured by end-to-end latency of the computer system. The end-to-end latency specifies the time delay between an input event (such as a mouse click) at an input device and a corresponding display event (such as a photon event) at a display device. The end-to-end latency of a computer system is also referred to as the "click-to-photon" latency. As a general matter, the end-to-end latency of the computer system indicates the overall real-world performance of the computer system and can be useful measurement for users in several ways. For example, a user can optimize the performance of the computer system by adjusting configuration settings of the computer system based on the end-to-end latency time of each configuration. As another example, a user can optimize the performance of the computer system by installing different hardware and/or software components that achieve lower end-to-end latency times.

Several prior techniques have been developed to measure the end-to-end latency of a computer system. These prior techniques typically rely on customized hardware components that are designed to detect when an input event occurs and when a display event occurs. These prior techniques usually also require a high level of user know-how to determine the end-to-end latency period. For example, one conventional technique includes connecting a press sensor having a light-emitting diode (LED) connected to a switch inside the input device. A high-speed video camera is then used to capture a video of the input event (as indicated by the LED) and a corresponding display event rendered on the display. A user then has to measure how many video frames are captured between the input event and the display event to determine the end-to-end latency period. One drawback of this approach is that additional components beyond common consumer-grade components, such as the modified input device and the high-speed video camera, are needed to implement the approach. Another drawback is that the user has to determine the end-to-end latency period by analyzing the resulting video frames, which is quite inefficient and requires the user to engage in a laborious manual inspection procedure or develop one or more dedicated processing algorithms.

As the foregoing illustrates, what is needed in the art are more effective approaches for measuring the end-to-end latency of a computer system.

SUMMARY

Various embodiments include a computer-implemented method for determining a system latency. The method includes detecting an input packet that has been generated in response to an input event received by an input device, and generating a first timestamp in response to detecting the input packet. The method also includes detecting a change in one or more pixel values that are associated with one or more target pixel locations within a display screen of a display device and caused by the input event. The method further includes generating a second timestamp in response to detecting the change in the one or more pixel values, and determining the system latency based on the first timestamp and the second timestamp.

At least one technological advantage of the disclosed techniques relative to the prior art is that the disclosed techniques enable the end-to-end latency of a computer system to be easily and conveniently measured without requiring customized components or a high level of user know-how. In this regard, the disclosed techniques enable the end-to-end latency of the computer system to be determined via a latency measurement module executed by a processor residing within the display device. Accordingly, the disclosed techniques provide a substantial technological advancement relative to prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

FIG. 3 is a conceptual diagram of the latency measurement table of FIG. 2, according to various embodiments;

DETAILED DESCRIPTION

Figure 1:
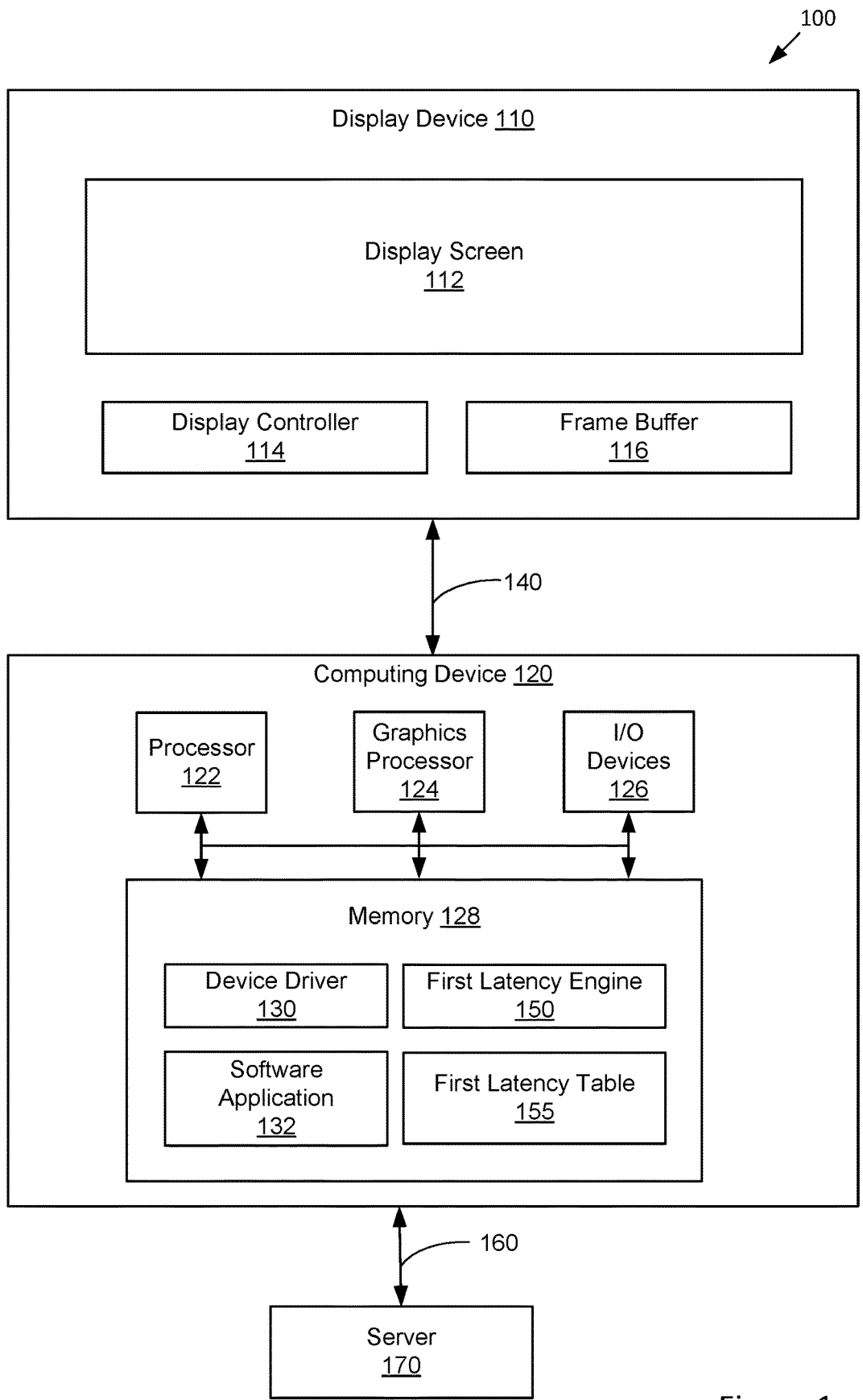
FIG. 1 illustrates a computing system configured to implement one or more aspects of the various embodiments.

In the following description, numerous specific details are set forth to provide a more thorough understanding of the various embodiments. However, it will be apparent to one skilled in the art that the inventive concepts may be practiced without one or more of these specific details.

Various embodiments include a display device configured to measure the end-to-end latency (system latency) of a computing system. The computing system includes an input device, a computing device, and the display device. The display device includes an input port, an output port, a video input connector, and a latency measurement engine. The display device is directly connected with the input device via the input port, and receives input signals (input data packets) generated by the input device via the input port. The display device is connected with the computing device via the output port, and passes the input packets generated by the input device to the computing device via a bus connection and output port. Therefore, in effect, the computing device is connected to the input device via the bus connection that passes through the display device. The display device is also connected with the computing device via the video input connector, and receives a video signal generated by the computing device.

The latency measurement engine executing on the display device is configured to measure the end-to-end latency (system latency) of the computing system that comprises an amount of time between an input event (such as a mouse click) occurring on the input device and a corresponding display event (photon event) caused by the input event that occurs on the display device. In some embodiments, the end-to-end latency of the computing system comprises the sum of three different latencies. A first latency comprises an amount of time (period of time) between the time an input event occurs at the input device and the time the corresponding input packet is generated by the input device in response to the input event. A second latency comprises an amount of time (period of time) between generation of the input packet for the input event and a corresponding change in pixel values caused by the input event at the display device. A third latency comprises an amount of time (period of time) between the change in pixel values caused by the input event and a corresponding display event (photon event) caused by the change in pixel values that occurs at the display device.

In some embodiments, the latency measurement engine determines an estimate (approximation) of the first latency. For example, the computing device can determine a type of the input device and an estimated first latency for the type of the input device via a lookup table. The computing device can then transmit the estimated first latency for the input device to the display device via the video input connector. As another example, for each input event, the input device can be configured to measure the first latency and include the first latency in the input packet generated by the input device in response to the input event.

In some embodiments, the latency measurement engine calculates the measured second latency by determining the time difference between a first timestamp and a second timestamp. In particular, the latency measurement engine detects ("spies") input packets that are passed through the bus connection between the input port and output port. When an input packet is detected on the bus connection, the latency measurement engine generates a first timestamp that represents the point in time that the input packet is generated and/or the point in time the input packet is detected by the latency measurement engine. The latency measurement engine also monitors the video signal received from the computing device via the video input connector. In particular, latency measurement engine analyzes pixel data received in the video signal and determines if pixel values have changed by a threshold degree for one or more target pixel locations. The one or more target pixel locations can be selected by the user, or set by default. If so, the latency measurement engine generates the second timestamp which represents the point in time the pixel values changed by the threshold degree. The latency measurement engine then determines the amount of time between the first timestamp to the second timestamp, which comprises the measured second latency.

In some embodiments, the latency measurement engine determines an estimate (approximation) of the third latency. The third latency comprises an amount of time that has lapsed between the time the pixel values changed (due to the input event) and the time a corresponding display event that would have occurred at the display device in response to the change in pixel values. The display event can comprise a photon event that satisfies a predetermined threshold criterion for changing brightness or color, such as 10% or 50% Gray-to-Gray (GtG). The latency measurement engine can determine the estimate of the third latency via a lookup table that maps different screen resolution and refresh rate combinations to different response times achieved for a predetermined threshold criterion. The latency measurement engine then sets the third latency as the response time determined for a current screen resolution and refresh rate of the display device.

The latency measurement engine then sums/adds the first latency, the second latency, and the third latency to determine the overall end-to-end latency of the computing system. The latency measurement engine can further cause information associated with the end-to-end latency to be displayed on the display device. For example, the latency measurement engine can leverage the on-screen display (OSD) to display information relating to the end-to-end latency, such as the total end-to-end latency, the first latency, the second latency, the third latency, or any combination thereof. The OSD can also display latency measurements for a plurality of latency tests in graph form, such as a histogram.

In some embodiments described herein, the computing system implements the Universal Serial Bus (USB) standard for communicating with input devices. In these embodiments, the input device comprises a USB input device that generates a USB input packet, and the display device includes a USB input port that connects with the USB input device and a USB output port that passes the USB input packet to the computing device. In other embodiments, the computing system implements any other non-USB standard for communicating with input devices.

System Overview

FIG. 1 illustrates a computing system 100 configured to implement one or more aspects of the various embodiments. In some embodiments, the total end-to-end latency of the computing system 100 is determined. As shown, computing system 100 includes a display device 110 coupled to a computing device 120.

Computing device 120 includes a processor 122, a graphics processor 124, input/output (I/O) devices 126, and memory 128, coupled together. Processor 122 includes any technically feasible set of hardware units configured to process data and execute software applications. For example, processor 122 could include one or more central processing units (CPUs). Graphics processor 124 includes any technically feasible set of hardware units configured to process graphics data and execute graphics applications. For example, graphics processor 124 could include one or more graphics processing units (GPUs). Memory 128 includes any technically feasible storage media configured to store data and software applications, such as, for example, a hard disk and/or a random-access memory (RAM) module, among others. Memory 128 includes a device driver 130, software application 132, a first latency engine 150, and a first latency table 155.

Device driver 130 includes program code that is executed by processor 122 to coordinate the operation of graphics processor 124. During execution, device driver 130 acts as an interface to graphics processor 124. Software application 132 includes program code that is executed by processor 122 to generate graphics processing tasks to be performed by graphics processor 124. In operation, software application 132 transmits these graphics processing tasks to device driver 130, and device driver 130 generates machine code that can be executed by graphics processor 124 to perform the graphics processing tasks. The graphics processing tasks could include, for example, graphics rendering operations, encoding operations, decoding operations, and so forth. When performing graphics rendering operations, graphics processor 124 generates images/video frames on behalf of software application 132 and then causes display device 110 to display those images/video frames. For example, software application 132 could be a video game that leverages graphics processor 124 to render images depicting a simulated environment. Display device 110 could display these images to the user via a display screen.

I/O devices 126 include any technically feasible set of devices configured to perform input and/or output operations, such as a keyboard, a mouse, a trackball, and so forth. I/O devices 126 include a video output connector that connects to the video input connector of the display device 110 for transmitting a video signal 140 to the display device 110. The graphics processor 124 generates images that are transmitted to be displayed on the display device 110 via the video signal 140. In particular, the video signal 140 comprises a stream of pixel data representing the images to be displayed on the display device 110. For each image/video frame, the pixel data can include red, green, and blue (RGB) values for each pixel location (as specified by x, y coordinates) on a screen of the display device 110. The video signal 140 can implement any technically feasible digital or analog signaling protocol, such high-definition multimedia interface (HDMI), digital visual interface (DVI), DisplayPort (DP) interface, and the like. The video interface/signal 140 can also include a bi-directional lower speed communication interface (such as DisplayPort AUX or HDMI i2c).

I/O devices 126 further include an input interface, such as a USB interface, that connects to an output port of the display device 110 for receiving input packets (such as USB packets) generated by an input device in response to input events. In response to receiving input packets via the input port, the software application 132, device driver 130, and graphics processor 124 operate in conjunction (as discussed above) to generate new images and transmit the new images to the display device 110 for displaying the new images. Therefore, new images are generated in response to the received input packets, which are generated in response to input events received at an input device (such as a mouse or keyboard). In effect, the input events received at the input device and/or the input packets received at the computing device 120 cause the new images to be generated at the computing device 120, and the new images to be transmitted to the display device 110. The latency time between receiving the input packets at the computing device 120 and generating the new images for the display device 110 in response to the input packets is included in the total end-to-end latency of the overall computing system 100.

In some embodiments, the I/O devices 126 may further include a network card comprising a network interface controller (NIC), network adapter, or similar computer hardware component that connects the computing device 120 to a network 160. The computing device 120 may be connected to a server 170 via the network 160. The server 170 can provide cloud-based services, such as video game applications, business applications, and any other type of service or application. In these embodiments, the software application 132 (such as a web browser or a cloud gaming application) interfaces and operates in conjunction with an application executing on the server 170 to generate and provide new images to the display device 110 for display. For example, the server 170 can provide a cloud-based video game service that operates in conjunction with the software application 132 to generate images of a video game that is displayed on the display device 110. In these embodiments, the latency time between receiving input packets at the computing device 120 and generating the new images for the display device 110 in response to the input packets includes the latency time for the computing device 120 and software application 132 to interact with the server 170 (via the network 160) for generating the new images for the display device 110. Therefore, the total end-to-end latency of the overall computing system 100 also includes the latency time for the computing device 120 and software application 132 to interact with the server 170 via the network 160 for generating the new images for the display device 110.

As discussed above, the memory 128 also includes the first latency engine 150, and the first latency table 155. The first latency engine 150 is configured to identify a type of the input device and an estimated (approximate) first latency based on the identified type of the input device via a lookup table (first latency table 155). The first latency engine 150 can identify the type of the input device by analyzing the vendor ID (VID)/product ID (PID) exchange on the input interface (such as a USB interface) when communicating with the input device. The type of the input device can include the manufacturer/brand and the model number of the input device. The first latency engine 150 then determines an estimated first latency based on the type of the input device via the first latency table 155. The first latency table 155 lists a plurality of different types of input devices and an estimated first latency for each type of input device. The estimate of the first latency for a type of input device comprises an average/typical amount of time that lapses between an input event occurring at the input device and generating the corresponding input packet (by the input device) in response to the input event. In some embodiments, if the first latency table 155 does not include a first latency listing for the identified type of input device, the first latency engine 150 can return a default first latency for the identified type of input device. The first latency engine 150 can then transmit the estimated first latency for the type of input device to the display device 110 via the video output connector. For example, the first latency engine 150 can issue a virtual control panel (VCP) command in the Monitor Control Command Set (MCCS) language via the video output connector, the VCP command specifying the estimated first latency for the type of input device.

By implementing the first latency engine 150 and the first latency table 155 on the computing device 120, the first latency table 155 can be updated easily, for example, via the network connection 160. In other embodiments, however, the first latency engine 150 and the first latency table 155 can reside on the display device 110, whereby the display device 110 determines the estimate of the first latency of the type of the input device. In further embodiments, for each input event, the input device itself can be configured to measure the actual first latency and include the first latency in the input packet generated by the input device in response to the input event.

Display device 110 includes a display screen 112, a display controller 114, and a frame buffer 116. The display device 110 may comprise any type of display/monitor, such as a liquid crystal display (LCD), digital light processing (DLP), plasma, OLED screen, and the like. The display screen 112 includes an array of pixels, each pixel location being specified by x, y coordinates. The frame buffer 116 stores images/video frame received from the computing device 120 via the video signal 140. For each image, the frame buffer 116 stores pixel data representing the image, the pixel data including RGB values for each pixel location on the display screen 122. In general, the display controller 114 displays an image on the display screen 112 by controlling the color of light emitted by each pixel/pixel location in the pixel array based on the RGB values specified for the pixel/pixel location.

Display Device for Measuring System Latency

Figure 2:
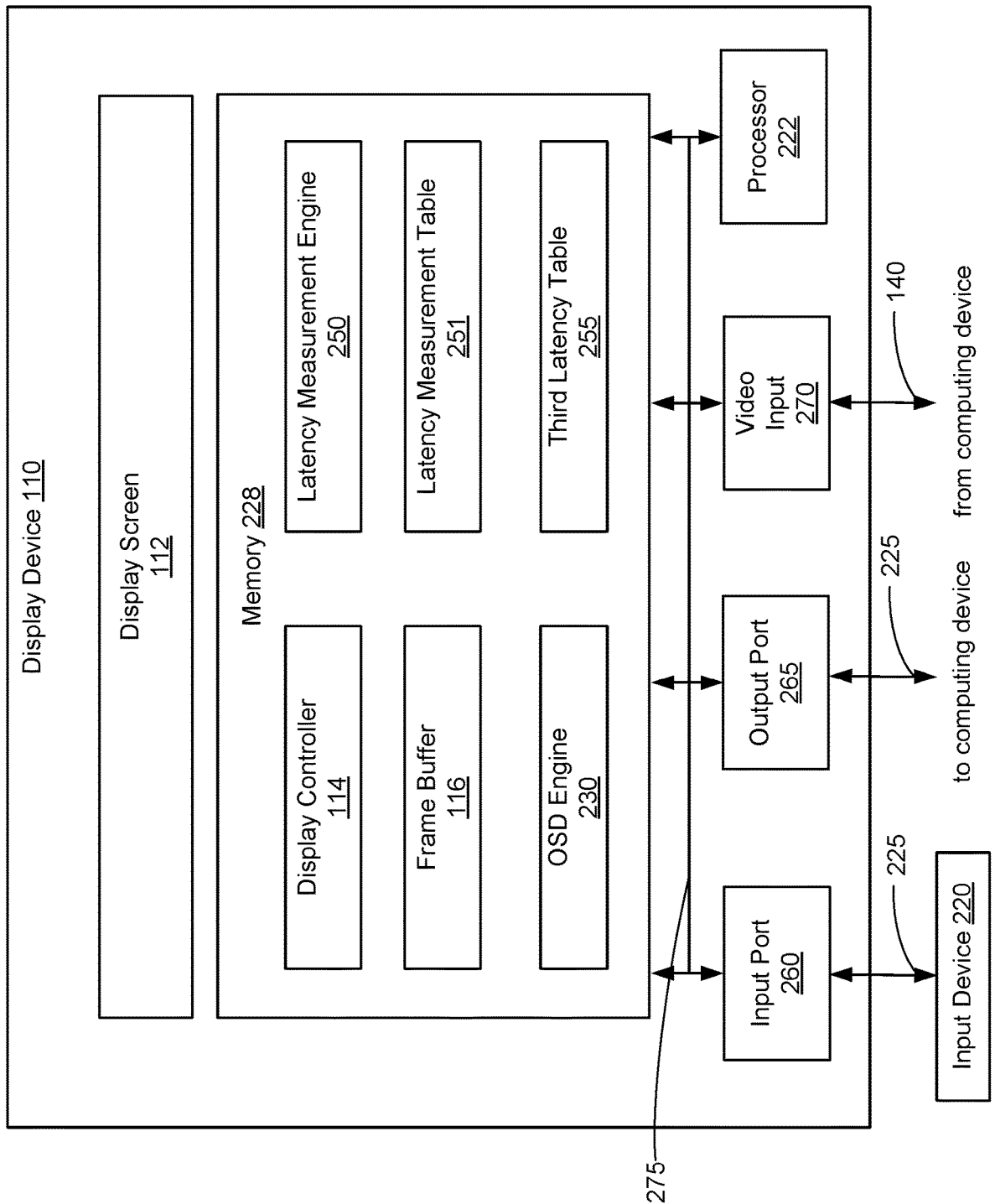
FIG. 2 is a more detailed illustration of the display device of FIG. 1, according to various embodiments.

FIG. 2 is a more detailed illustration of the display device 110 of FIG. 1, according to various embodiments. The display device 110 includes the display screen 112, a processor 222, a memory 228, an input port 260, an output port 265, a video input connector 270, coupled together via a bus connection 275.

The processor 222 includes any technically feasible set of hardware units configured to process data and execute software applications. Processor 222 could be, for example, a central processing unit (CPU), a graphics processing unit (GPU), an application-specific integrated circuit (ASIC), a field-programmable gate array (FPGA), and so forth. Memory 228 includes any technically feasible storage media configured to store data and software applications, such as, for example, a random-access memory (RAM) module, a read-only memory (ROM), flash memory, static random-access memory (SRAM), dynamic random-access memory (DRAM), electrically erasable programmable read-only memory (EEPROM), or any combination thereof.

The display device 110 is directly connected with an input device 220 via the input port 260, and receives input data packets 225 generated by the input device 220 via the input port 260 (such as a USB input port). In other embodiments, the display device 110 can include a USB hub for receiving USB inputs from other USB peripheral devices. The display device 110 is connected with the computing device 120 via the output port 265, and passes the input packets 225 (such as USB packets) generated by the input device 220 to the computing device 120 via the bus connection 275 and the output port 265. The input device 220 can comprise any category of input device, such as a mouse, a keyboard, a game controller, a trackball, and so forth. The input device 220 can comprise a USB or non-USB input device. The input port 260 is connected to the output port 265 via the bus connection 275. The output port 265 can be connected to an input interface (such as a USB interface) of the computing device 120. Therefore, in effect, the computing device 120 is connected to the input device 220 via the bus connection 275 that passes through the display device 110 without adding delay, which allows accurate measuring of the end-to-end latency of the computing system under test. The display device 110 is also connected with the computing device 120 via the video input connector 270, and receives a video signal 140 generated by the computing device 120. The video input connector 270 can be connected to a video output connector of the computing device 120 that transmits the video signal 140 to the display device 110.

Memory 228 includes a display controller 114, frame buffer 116, on-screen display (OSD) engine 230, latency measurement engine 250, a latency measurement table 251, and a third latency table 255. In some embodiments, the latency measurement engine 250 is configured to measure the end-to-end latency of the computing system 100 that comprises an amount of time that has lapsed between an input event occurring on the input device 220 and a corresponding display event occurring on a display screen 112 of the display device 110. The input event can be any type of user input received on any input device, such as a click on a mouse, a keystroke on a keyboard, a movement on a game controller, and the like. The corresponding display event can comprise a photon event that satisfies a predetermined threshold criterion.

In some embodiments, the end-to-end latency of the computing system 100 comprises the total sum of three different latencies: a first latency (input latency), a second latency (pixel change latency), and a third latency (display latency). The end-to-end latency is also referred to herein as a system latency. The first latency is also referred to herein as an input latency of the input device 220. The first latency comprises an amount of time that has lapsed between the time an input event occurs at the input device 220 and the time the input device 220 generates the corresponding input packet 225 in response to the input event. The input event can comprise, for example, a mouse click or detected pressure on the mouse button. The second latency is also referred to herein as a pixel change latency. The second latency comprises an amount of time that has lapsed between the time the input packet 225 is generated for the input event and the time a threshold change in pixel values occurs for one or more target pixel locations on the display screen 112 of the display device 110. The threshold change in pixel values for the one or more target pixel locations is caused by the input event. The third latency is also referred to herein as a display latency of the display device 110. The third latency comprises an amount of time that has lapsed between the time the pixel values change due to the input event and the time a corresponding display event/photon event caused by the change in pixel values occurs at the display screen 112 of the display device 110.

In some embodiments, the latency measurement engine 250 determines an estimate (approximation) of the first latency. For example, a first latency engine 150 executing on the computing device 120 can determine a type of the input device 220 and an estimated first latency for the type of the input device 220 via the first latency table 155. The computing device 120 can then transmit the estimated first latency for the input device 220 to the latency measurement engine 250 via the video input connector 270. In other embodiments, the first latency engine 150 and the first latency table 155 can reside on the display device 110, whereby the display device 110 determines the estimate of the first latency of the type of the input device 220. In further embodiments, for each input event, the input device 220 itself can be configured to measure the actual first latency and include the first latency in the input packet 225 generated by the input device 220 in response to the input event.

In some embodiments, the latency measurement engine 250 calculates the second latency by determining the time difference between a first timestamp and a second timestamp. As discussed above, an input packet 225 generated for an input event is received by the display device 110 at the input port 260, and transmitted to the output port 265 via the bus connection 275. The latency measurement engine 250 can be configured to monitor the bus connection 275 and detect ("spy") input packets 225 that are passed through the bus connection 275 between the input port 260 and output port 265. When an input packet 225 is detected, the latency measurement engine 250 generates a copy of the input packet 225 for further processing. Meanwhile, the original input packet 225 is permitted to pass to the output port 265 to the computing device 120 without adding delay, which allows accurate measuring of the end-to-end latency of the computing system 100 under test.

For example, the latency measurement engine 250 can process the copy of the input packet 225 by adding the first timestamp, decoding the copy of the input packet 225, and analyzing the decoded information. In general, an input packet 225 contains data that describes the input event, such as data specifying a "left mouse button click," "right mouse button click," "trackball moved by X horizontal and Y vertical," "keystroke M," and so forth. The latency measurement engine 250 can decode and analyze the copy of the input packet 225 to verify that the input packet 225 is in fact associated with an input event received by an input device 220 before proceeding with the further operations described below. In other embodiments, the input packet 225 can also contain data that specifies the actual first latency as measured by the input device 220. In these embodiments, the latency measurement engine 250 can decode and analyze the copy of the input packet 225 to determine the value of the first latency.

When the input packet 225 is detected on the bus connection 275, the latency measurement engine 250 generates a first timestamp associated with the input packet 225. Note that the point in time that the input packet 225 is generated is nearly equivalent to the point in time that the input packet 225 is detected on the bus connection 275 by the latency measurement engine 250, and there is typically a negligible delay difference between the two points in time. Therefore, the first timestamp can represent the point in time that the input packet 225 is generated and/or the point in time the input packet 225 is detected by the latency measurement engine 250. The latency measurement engine 250 can also be configured to monitor the video signal 140 received from the computing device 120 via the video input connector 270. In particular, the latency measurement engine 250 analyzes pixel data received in the video signal 140 and determines if the pixel values have changed by a threshold degree for one or more target pixel locations of the display screen 112. The one or more target pixel locations can be selected by the user. In other embodiments, the one or more target pixel locations can be set by default, for example, by an application executing on the computing device 120 that transmits a command over the video interface/signal 140. For example, the application executing on the computing device 120 can set the one or more target pixel locations based on a current game. If so, the latency measurement engine 250 generates the second timestamp which represents the point in time the pixel values changed by the threshold degree due to the occurrence of the input event. The latency measurement engine 250 then determines the amount of time that elapsed between the first timestamp and the second timestamp, which comprises the second latency.

In some embodiments, the latency measurement engine 250 determines an estimate (approximation) of the third latency. As discussed above, the third latency comprises an amount of time that has lapsed between the time the pixel values change (due to the input event) and the time a corresponding display event that would have occurred at the display screen 112 in response to the change in pixel values. The display event can comprise a photon event that satisfies a predetermined threshold criterion. In particular, the display event can comprise a predetermined amount/degree of change in photon emission that would occur at the display screen 112 in response to the change in pixel values. For example, the predetermined threshold criterion can comprise a particular Gray-to-Gray (GtG) level, such as 10% or 50% GtG. The latency measurement engine 250 can first determine current screen resolution and refresh rate settings for the display device 110 and then determine the estimate of the third latency via a lookup table (the third latency table 255). The third latency table 255 maps different screen resolution and refresh rate combinations to different response times corresponding to a predetermined threshold criterion, such as 10% or 50% GtG. In particular, for the predetermined threshold criterion, the third latency table 255 lists a plurality of different combinations/pairings of screen resolutions and refresh rates and a corresponding response time (estimated third latency) for each such combination/pairing. In other embodiments, the table can have further entries for different LCD Overdrive strengths settings, such as Off, Normal, Extreme, which can change the photon response time of the display device. The latency measurement engine then sets the value of the third latency equal to the response time determined for the current screen resolution and refresh rate of the display device 110 via the third latency table 255.

The latency measurement engine 250 then calculates the total end-to-end latency of the computing system 100 by summing/adding the values determined for the first latency, the second latency, and the third latency. The latency measurement engine 250 can store various data/information to the latency measurement table 251 for determining the total end-to-end latency of the computing system 100.

FIG. 3 is a conceptual diagram of the latency measurement table 251 of FIG. 2, according to various embodiments. The latency measurement table 251 comprises a first section 310, a second section 320, and a third section 330. The first section 310 can comprise entries for storing data/information associated with determining the first latency. The second section 320 can comprise entries for storing data/information associated with determining the second latency. The third section 330 can comprise entries for storing data/information associated with determining the third latency.

The first section 310 can include a first entry 311 for storing a value for an estimated first latency. The estimated first latency can include the approximate first latency determined via a lookup table (first latency table 155) based on the type of input device 220. In other embodiments, the first section 310 can include a second entry 312 for storing a value for a measured first latency. The measured first latency can be contained in the input packet 225 that is received from the input device 220, whereby the input packet 225 is decoded to determine the value of the measured first latency. The decoded data of the input packet 225 can also be stored to the second entry 312.

The second section 320 can include a first entry 321 for storing prior pixel values for one or more target pixel locations of the display screen 112 that exist prior to the occurrence of the input event. Therefore, the prior pixel values represent the pixel values of the one or more target pixel locations before the end-to-end latency of the computing system 100 is measured. The one or more target pixel locations can be selected by the user, or set by default. The prior pixel values can be calculated by retrieving pixel values from the frame buffer 116 for the one or more target pixel locations, and processing the retrieved pixel values to determine the prior pixel values. For example, the prior pixel values can include an average value for each element of luminance, R, G, and B for the one or more target pixel locations. In these embodiments, the prior pixel values include an average luminance value, an average R value, an average G value, and an average B value for the one or more target pixel locations. In other embodiments, the prior pixel values include the average luminance value, the average R value, the average G value, the average B value, or any combination thereof for the one or more target pixel locations. In some embodiments, the one or more target pixel locations include only one pixel location (such as the center pixel location) of the display screen 112. In these embodiments, the prior pixel values include the luminance value, the R value, the G value, the B value for the target pixel location.

The second section 320 can include a second entry 322 for storing a first timestamp that represents the point in time that the input packet 225 is generated and/or the point in time the input packet 225 is detected by the latency measurement engine 250.

The second section 320 can include a third entry 323 for storing new pixel values for the one or more target pixel locations of the display screen 112 that exist after the occurrence of the input event. The new pixel values represent the pixel values of the one or more target pixel locations that are caused by the occurrence of the input event and the processing of the resulting input packet 225 by the computing device 120. The computing device 120 generates a new image in response to the processing of the input packet 225 and sends pixel data for the new image to the display device 110 via the video signal 140. The new pixel values can be calculated by obtaining pixel values from the video signal 140 for the one or more target pixel locations, and processing the obtained pixel values to determine the new pixel values. For example, the new pixel values can include an average luminance value, an average R value, an average G value, and an average B value for the one or more target pixel locations. In other embodiments, the new pixel values include the average luminance value, the average R value, the average G value, the average B value, or any combination thereof for the one or more target pixel locations. If the one or more target pixel locations include only one pixel location (such as the center pixel location) of the display screen 112, the new pixel values include the luminance value, the R value, the G value, the B value for the target pixel location.

The second section 320 can include a fourth entry 324 for storing a second timestamp that represents the point in time that the pixel values for the one or more target pixel locations changed by a threshold degree due to the occurrence of the input event. The latency measurement engine 250 can determine the second timestamp by comparing the new pixel values (stored in the third entry 323) to the prior pixel values (stored in the first entry 321) to determine if the difference/delta between new pixel values and the prior pixel values satisfy the threshold degree. In some embodiments, the threshold degree is satisfied if any of the average luminance value, average R value, average G value, or the average B value has changed by X % or more from the prior pixel values. In other embodiments, the threshold degree is satisfied if the average luminance value, average R value, average G value, the average B value, or any combination thereof changes by X % or more from the prior pixel values.

The threshold degree (X %) can be selected by the user, or set by default (such as 50%). The threshold degree (X %) can also be stored to the fourth entry 324.

The second section 320 can include a fifth entry 325 for storing the value of the measured second latency based on the first timestamp and the second timestamp. The latency measurement engine 250 determines the amount of time that elapsed between the first timestamp and the second timestamp, which comprises the second latency.

The third section 330 can include a first entry 331 for storing a value for an estimated third latency. The estimated third latency can include the approximate third latency determined via a lookup table (third latency table 255) based on the current screen resolution and refresh rate settings of the display device 110.

The latency measurement table 251 can further include an entry 340 for storing a value for the total end-to-end latency (click-to-photon latency) of the computing system 100. The total end-to-end latency comprises the sum of the first latency, the second latency, and the third latency. The end-to-end latency of the computing system 100 can be measured/tested repeatedly to generate more latency information for the user. In these embodiments, running averaging over multiple measurements can be computed for eliminating small/noise variations. In other embodiments, computing standard deviation and standard error {stdev/sqrt (N)} can also be performed to help users see how representative the current running average is likely to be. The latency measurement engine 250 can generate a different latency measurement table 251 for each such end-to-end latency measurement/test. If the computing system 100 is connected to another computing system (such as server 170) via a network 160, the total end-to-end latency includes the latency time for the computing system 100 to interact with the server 170 via the network 160 for generating the new images for the display device 110.

OSD User Interface

After the end-to-end latency is determined, the latency measurement engine 250 can cause information associated with the end-to-end latency to be displayed on the display device. For example, the latency measurement engine can leverage the on-screen display (OSD) engine 230 of the display device 110 to display information relating to the end-to-end latency. The OSD engine 230 can be further leveraged by the latency measurement engine 250 to receive various user inputs. In particular, the OSD engine 230 can generate and display a user interface for receiving user inputs and displaying latency information.

Figure 4:
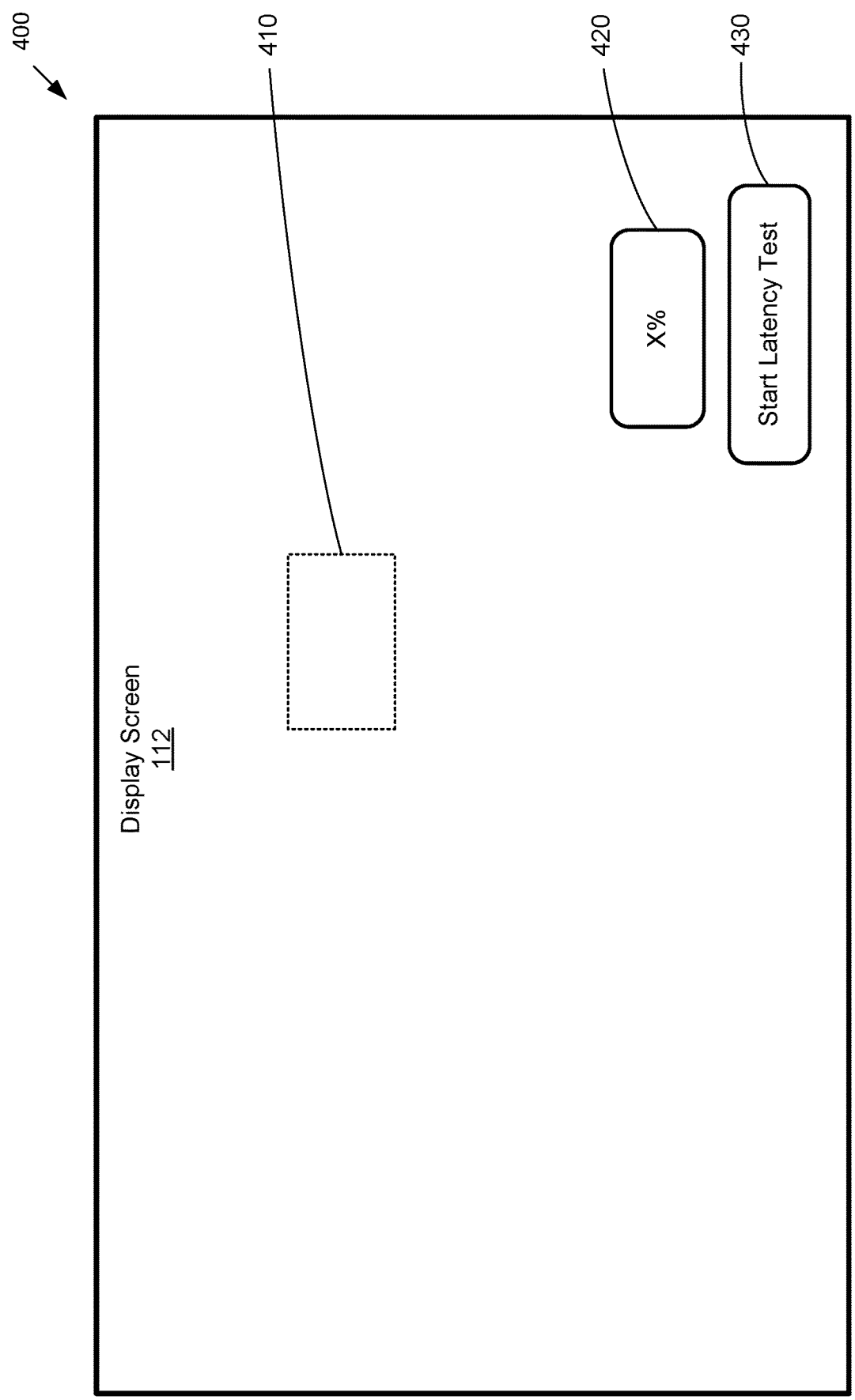
FIG. 4 is an exemplary screenshot of an OSD user interface for receiving one or more user inputs, according to various embodiments.

FIG. 4 is an exemplary screenshot of an OSD user interface 400 for receiving one or more user inputs, according to various embodiments. The user interface 400 is generated by the OSD engine 230 of the display device 110. In the example of FIG. 4, the OSD user interface 400 displays a target rectangle 410 that is moveable and/or resizable by the user along the display screen 112, for example, via hard buttons provided on the display device 110. The target rectangle 410 is moveable to any position within the display screen 112 to select one or more target pixel locations of the display screen 112. When the target rectangle 410 is moved to the desired position by the user, the user then inputs a selection button that selects the pixel locations within the target rectangle 410 as the one or more target pixel locations. In other embodiments, the one or more target pixel locations are selected by default by the latency measurement engine 250, such as a single center pixel of the display screen 112 or a center rectangle of pixels within the display screen 112.

The OSD user interface 400 can also display a threshold degree selector 420 that allows the user to select the threshold degree for the change in pixel values used to determine the second latency. The user can increase or decrease the threshold degree, for example, via hard buttons provided on the display device 110. The OSD user interface 400 can further display a start latency measurement/test selector 430 that allows the user to initiate/trigger the end-to-end latency measurement/test of the computing system 100. The user can select the start latency measurement/test selector 430, for example, via hard buttons provided on the display device 110.

Figure 5:
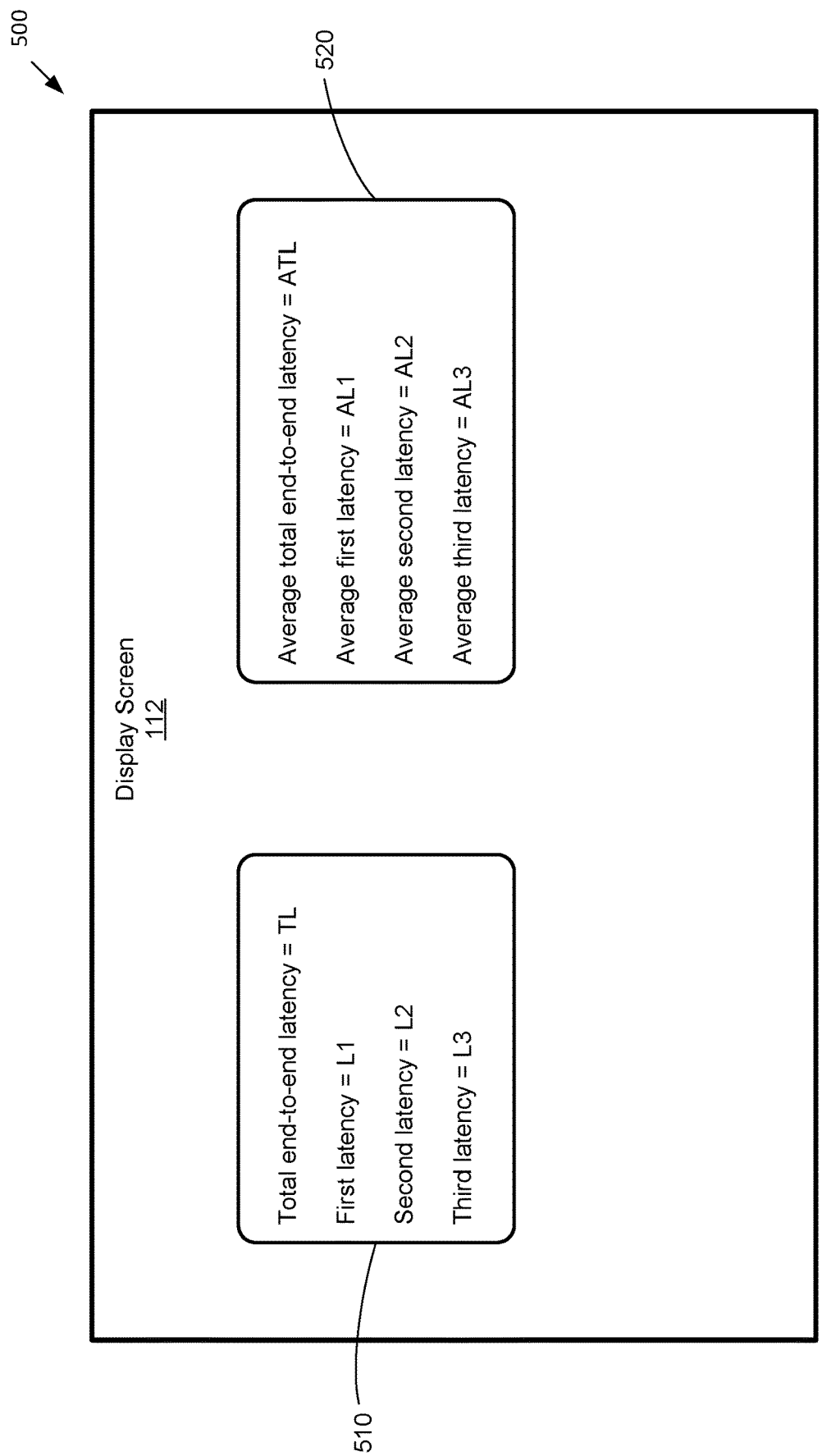
FIG. 5 is an exemplary screenshot of an OSD user interface for displaying latency information to a user, according to various embodiments.

FIG. 5 is an exemplary screenshot of an OSD user interface 500 for displaying latency information to a user, according to various embodiments. The user interface 500 is generated by the OSD engine 230 of the display device 110. In the example of FIG. 5, the OSD user interface 500 displays a first set of latency information 510 for a single latency measurement/test, including a total end-to-end latency, the first latency, the second latency, and the third latency. As noted above, the end-to-end latency of the computing system 100 can be measured/tested repeatedly to generate more latency information. In the example of FIG. 5, the OSD user interface 500 can also display a second set of latency information 520 for multiple latency measurements/tests, including an average total end-to-end latency, an average first latency, an average second latency, and an average third latency. In further embodiments, the OSD user interface 500 can display latency information for multiple latency measurements/tests in graph form, such as a histogram. For example, the histogram can have an x-axis for the end-to-end latency times recorded for the multiple tests and a y-axis for the number of occurrences for each particular end-to-end latency time. A graph of latency over time can also be displayed, to show how latency behaved the past few seconds or minutes, so that the user can make a change to game or driver settings and see a resulting upward or downward 'step' in latency. In other embodiments, the OSD user interface 500 can display other types of latency information in any form.

Figure 6A:
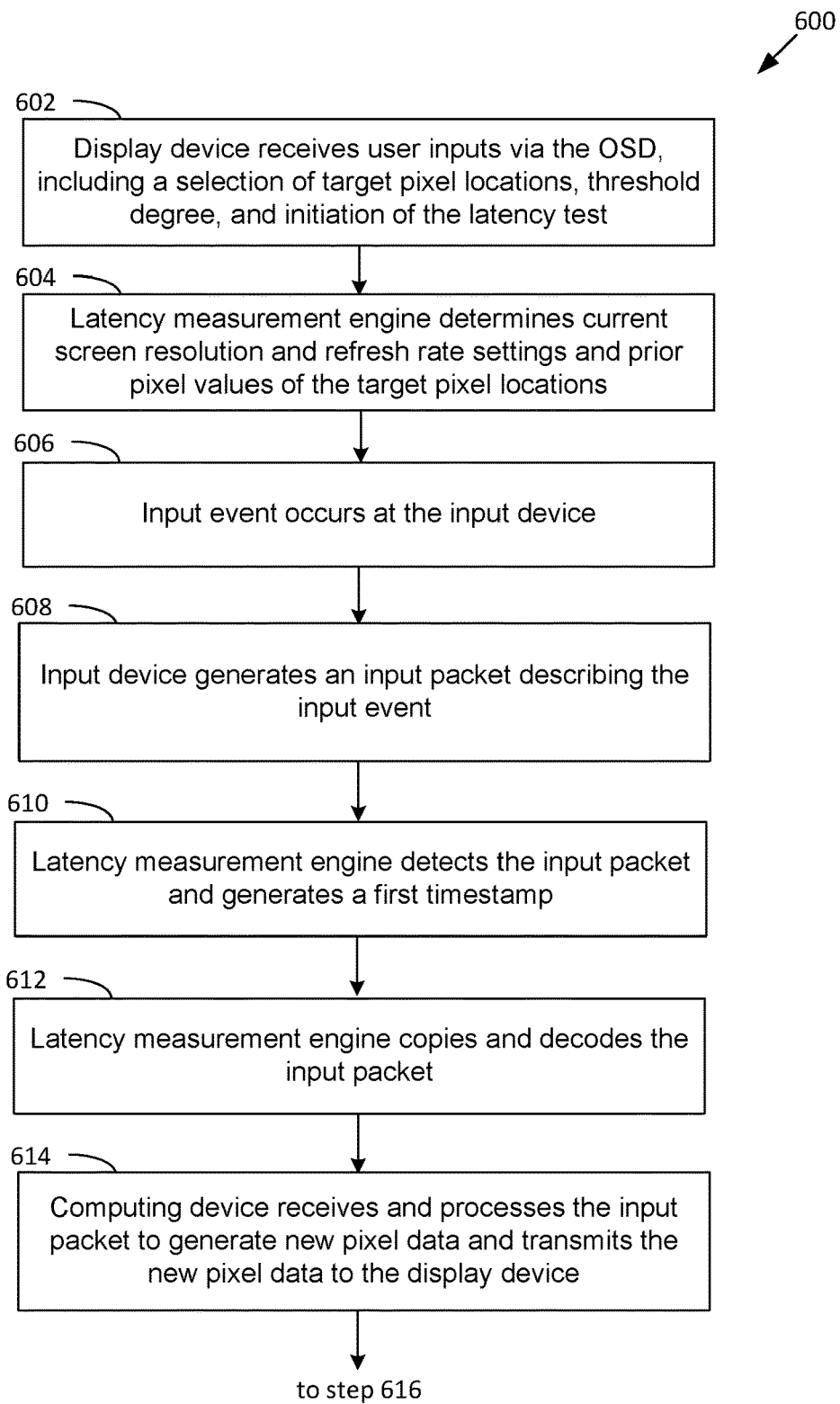
FIGS. 6A-B set forth a flow diagram of method steps for measuring the end-to-end latency of a computing system, according to various embodiments.
Figure 6B:
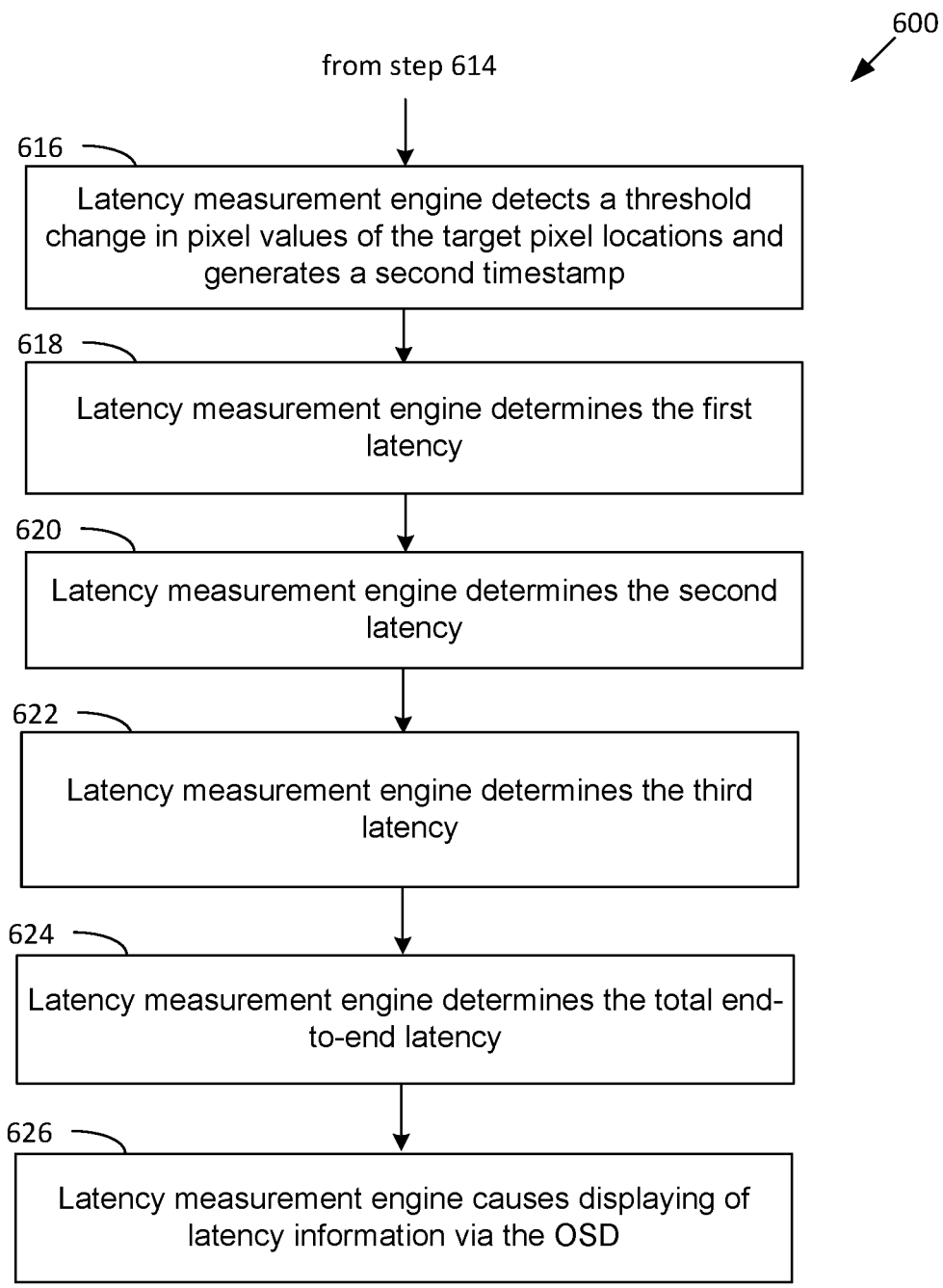

FIGS. 6A-B set forth a flow diagram of method steps for measuring the end-to-end latency of a computing system, according to various embodiments. Although the method steps are described in conjunction with the systems of FIGS. 1-5, persons skilled in the art will understand that any system configured to perform the method steps in any order or in parallel falls within the scope of the present embodiments.

As shown, a method 600 begins at step 602, where the display device 110 receives user inputs via the OSD user interface 400 generated by the OSD engine 230. The user inputs can include a selection of one or more target pixel locations on the display screen 112 that are selected via a target rectangle 410. In other embodiments, instead of user inputs, the one or more target pixel locations can be based on VCP commands received from an application executing on the computing device 120. The user inputs can also include a selection of a threshold degree (for determining the second latency) that is selected via a threshold degree selector 420. The user inputs can further include an initiation/triggering of the end-to-end latency measurement/test of the computing system 100 that is initiated via a start latency measurement/test selector 430.

At step 604, the latency measurement engine 250 determines current settings and pixel values for the display device 110 (used for determining the third latency). For example, the latency measurement engine 250 determines the current screen resolution and refresh rate settings of the display device 110 (used for determining the third latency). The latency measurement engine 250 also determines prior pixel values for one or more target pixel locations. For example, the prior pixel values can be calculated by retrieving pixel values from the frame buffer 116 for the one or more target pixel locations, and processing the retrieved pixel values to determine the prior pixel values. The prior pixel values can include an average luminance value, an average R value, an average G value, an average B value, or any combination thereof for the one or more target pixel locations. The calculated prior pixel values can be stored to the latency measurement table 251. Note that the prior pixel values represent pixel values for the one or more target pixel locations that exist prior to the occurrence of the input event, whereas the new pixel values discussed below represent pixel values for the one or more target pixel locations that exist after the occurrence of the input event and are caused by the occurrence of the input event.

At step 606, an input event occurs at the input device 220, such as a click on a mouse, a keystroke on a keyboard, a movement on a game controller, and the like. At step 608, the input device 220 generates an input packet 225 containing data that describes the input event. For example, the input device 220 can comprise a USB input device that generates a USB input packet 225. In other embodiments, the input device 220 can comprise a non-USB input device that generates a non-USB input packet 225. In further embodiments, the input device 220 measures the first latency between the occurrence of the input event and the generating of the input packet 225, and includes the value for the first latency in the input packet 225.

At step 610, the latency measurement engine 250 detects the input packet 225 on the bus connection 275 and, in response to detecting the input packet 225, generates a first timestamp for the input packet 225. The first timestamp represents the point in time that the input packet 225 is generated and/or the point in time the input packet 225 is detected by the latency measurement engine 250. The first timestamp can be stored to the latency measurement table 251. At step 612, the latency measurement engine 250 produces a copy of the input packet 225 and decodes the input packet 225. The decoded packet information of the input packet 225 can be used to verify that the input packet 225 relates to an input event before proceeding to further operations described below. In In other embodiments, the decoded packet information can also contain a value for the first latency.

Note that at step 608, the generated input packet 225 is transmitted to the input port 260 of the display device 110 and passed to the computing device 120 via the bus connection 275 and the output port 265 of the display device 110. At step 614, the computing device 120 receives and processes the input packet 225 to generate new pixel data for a new image based on the input packet 225. The new pixel data for the new image is transmitted to the display device 110 via the video signal 140.

At step 616, the latency measurement engine 250 detects a change in pixel values of the one or more target pixel locations and, in response, generates a second timestamp representing the point in time the change in pixel values is detected. The change in pixel values of the one or more target pixel locations is caused by the occurrence of the input event. The latency measurement engine 250 can determine that the change in pixel values has occurred by determining that the prior pixel values of the one or more target pixel locations have changed by a threshold degree (X %), as determined by analyzing new pixel values of the one or more target pixel locations. The new pixel values can be calculated by obtaining pixel values from the video signal 140 for the one or more target pixel locations, and processing the obtained pixel values to determine the new pixel values. The new pixel values can include an average luminance value, an average R value, an average G value, an average B value, or any combination thereof for the one or more target pixel locations. The new pixel values represent pixel values for the one or more target pixel locations that are caused by the occurrence of the input event and the processing of the corresponding input packet 225 by the computing device 120. The new pixel values and the second timestamp can be stored to the latency measurement table 251.

At step 618, the latency measurement engine 250 determines the first latency (input latency). In some embodiments, the latency measurement engine 250 receives an estimated first latency from the computing device 120 that determines the estimated first latency via a first latency table 155 based on the type of input device. In other embodiments, the latency measurement engine 250 receives a measured first latency in an input packet 225 from the input device 220 that measures the first latency. The value for the first latency can be stored to the latency measurement table 251. At step 620, the latency measurement engine 250 determines the second latency (pixel change latency) by calculating the amount of time that lapsed between the first timestamp and the second timestamp, the amount of lapsed time comprising the second latency. The value for the second latency can be stored to the latency measurement table 251. At step 622, the latency measurement engine 250 determines the third latency (display latency) via a third latency table 255 based on the current screen resolution and refresh rate settings of the display device 110. The third latency can comprise an estimate of the response time of the display device 110 for the current screen resolution and refresh rate settings for a predetermined threshold criterion (such as 10% or 50% GtG). The value for the third latency can be stored to the latency measurement table 251. At step 624, the latency measurement engine 250 determines the total end-to-end latency by summing the values for the first latency, the second latency, and the third latency. The value for the total end-to-end latency can be stored to the latency measurement table 251.

At step 626, the latency measurement engine 250 causes displaying of latency information via an OSD user interface 500 generated by the OSD engine 230. The OSD user interface 500 can display a first set of latency information 510 for a single latency measurement/test, including a total end-to-end latency, the first latency, the second latency, and the third latency. If the method 600 is performed multiple times to generate multiple end-to-end latency measurements of the computing system 100, the OSD user interface 500 can also display a second set of latency information 520 for multiple latency measurements/tests, including an average total end-to-end latency, an average first latency, an average second latency, and an average third latency. In further embodiments, the OSD user interface 500 can display the latency information in graph form, such as a histogram. The method 600 then ends.

In sum, a display device is configured to measure the end-to-end latency of a computing system. The computing system includes an input device, a computing device, and the display device. The computing system can further include a server connected to the computing device via a network. The display device includes an input port, an output port, a video input connector, and a latency measurement engine. The display device is directly connected with the input device via the input port, and receives input data packets generated by the input device via the input port. The display device is connected with the computing device via the output port, and passes the input packets generated by the input device to the computing device via a bus connection and output port. The display device is also connected with the computing device via the video input connector, and receives a video signal generated by the computing device.

The latency measurement engine executing on the display device is configured to measure the end-to-end latency of the computing system that comprises an amount of time between an input event occurring on the input device and a corresponding display event (photon event) caused by the input event that occurs on the display device. The end-to-end latency of the computing system comprises the sum of three different latencies. A first latency comprises an amount of time between the time an input event occurs at the input device and the time the corresponding input packet is generated by the input device in response to the input event. A second latency comprises an amount of time between generation of the input packet for the input event and a corresponding change in pixel values caused by the input event at the display device. A third latency comprises an amount of time between the change in pixel values caused by the input event and a corresponding display event (photon event) caused by the change in pixel values that occurs at the display device.

In some embodiments, an estimate of the first latency is determined via a lookup table based on the type of input device. In other embodiments, the input device measures the first latency and includes the first latency in the generated input packet. In some embodiments, the latency measurement engine calculates the measured second latency by determining the time difference between a first timestamp and a second timestamp. The first timestamp represents the point in time that the input packet is generated and/or the point in time the input packet is detected by the latency measurement engine. The second timestamp represents the point in time the pixel values changed by a threshold degree. In some embodiments, the latency measurement engine determines an estimate of the third latency via a lookup table based on the current screen resolution and refresh rate settings. The latency measurement engine then sums/adds the first latency, the second latency, and the third latency to determine the overall end-to-end latency of the computing system. The latency measurement engine can further cause various latency information to be displayed on the display device via the OSD engine on the display device.

At least one technological advantage of the disclosed techniques relative to the prior art is that the disclosed techniques enable the end-to-end latency of a computer system to be easily and conveniently measured without requiring customized components or a high level of user know-how. In this regard, the disclosed techniques enable the end-to-end latency of the computer system to be determined via a latency measurement module executed by a processor residing within the display device. Another technological advantage of the disclosed techniques relative to the prior art is that the end-to-end latency of a computer system can be quickly determined and displayed to the user. Therefore, the disclosed techniques allow the user to readily evaluate the real-world performance of the computer system for various purposes, such as debugging, trouble-shooting, and performance optimization. For example, the user can change screen resolution and/or screen refresh settings based on the test measurements to reduce the end-to-end latency. In addition, software and hardware engineers can ensure designed systems can meet intended design constraints and performance goals. Further, the disclosed techniques are especially useful in gaming environments, as the total system latency is a significant factor for gamers as it indicates the responsiveness of the game and gaming system. A relatively high system latency makes a game feel sluggish as well as hurts in-game performance of the gamer. The disclosed techniques can be used by gamers to ensure the graphics settings are optimized for lowest latency and by tournament organizers to validate fair conditions for competition at a reasonable cost. Accordingly, the disclosed techniques provide a substantial technological advancement relative to prior art approaches.

Aspects of the subject matter described herein are set out in the following numbered clauses.

1. In some embodiments, a computer-implemented method for determining a system latency, the method comprising: detecting an input packet that has been generated in response to an input event received by an input device; generating a first timestamp in response to detecting the input packet; detecting a change in one or more pixel values that are associated with one or more target pixel locations within a display screen of a display device and caused by the input event; generating a second timestamp in response to detecting the change in the one or more pixel values; and determining the system latency based on the first timestamp and the second timestamp.

2. The computer-implemented method of clause 1, further comprising displaying information associated with the system latency to a user via a user interface.

3. The computer-implemented method of any of clauses 1-2, wherein detecting the change in the one or more pixel values comprises detecting that the one or more pixel values have changed by at least a threshold amount.

4. The computer-implemented method of any of clauses 1-3, further comprising determining an input latency associated with the input device, wherein the system latency is further based on the input latency.

5. The computer-implemented method of any of clauses 1-4, wherein the input latency comprises an amount of time between when the input event occurs and when the input packet is generated in response to the input event.

6. The computer-implemented method of any of clauses 1-5, wherein the input latency comprises an estimated input latency associated with the input device.

7. The computer-implemented method of any of clauses 1-6, further comprising determining a display latency associated with the display device, wherein the system latency is further based on the display latency.

8. The computer-implemented method of any of clauses 1-7, wherein the display latency comprises an amount of time between when the change in the one or more pixel values of the one or more target pixel locations and when a corresponding photon event occurs on the display screen of the display device.

9. The computer-implemented method of any of clauses 1-8, wherein display latency comprises an estimated display latency based on a screen resolution and a refresh rate of the display device.

10. The computer-implemented method of any of clauses 1-9, wherein the system latency is further based on an input latency and a display latency.

11. In some embodiments, one or more non-transitory computer-readable media including instructions that, when executed by one or more processors, cause the one or more processors to determine a system latency by performing the steps of: detecting an input packet that has been generated in response to an input event received by an input device; generating a first timestamp in response to detecting the input packet; detecting a change in one or more pixel values that are associated with one or more target pixel locations within a display screen of a display device and caused by the input event; generating a second timestamp in response to detecting the change in the one or more pixel values; and determining the system latency based on the first timestamp and the second timestamp.

12. The one or more non-transitory computer-readable media of clause 11, further comprising displaying information associated with the system latency to a user via a user interface.

13. The one or more non-transitory computer-readable media of any of clauses 11-12, wherein detecting the change in the one or more pixel values comprises detecting that the one or more pixel values have changed by at least a threshold amount.

14. The one or more non-transitory computer-readable media of any of clauses 11-13, further comprising determining an input latency associated with the input device, wherein the system latency is further based on the input latency.

15. The one or more non-transitory computer-readable media of any of clauses 11-14, further comprising determining a display latency associated with the display device, wherein the system latency is further based on the display latency.

16. In some embodiments, a display device, comprising: a display screen; and a latency engine that determines a system latency by performing the steps of: detecting an input packet that has been generated in response to an input event received by an input device; generating a first timestamp in response to detecting the input packet; detecting a change in one or more pixel values that are associated with one or more target pixel locations within the display screen and caused by the input event; generating a second timestamp in response to detecting the change in the one or more pixel values; and determining the system latency based on the first timestamp and the second timestamp.

17. The display device of clause 16, wherein the latency engine performs the additional steps of determining an input latency associated with the input device, wherein the input packet is generated by the input device, and the input device is directly connected to the display device.

18. The display device of any of clauses 16-17, wherein the input latency comprises an amount of time between when the input event occurs and when the input packet is generated in response to the input event.

19. The display device of any of clauses 16-18, wherein the latency engine performs the additional steps of determining a display latency associated with the display device, wherein the system latency is further based on the display latency.

20. The display device of any of clauses 16-19, wherein the display latency comprises an estimated display latency based on a screen resolution and a refresh rate of the display device.

Any and all combinations of any of the claim elements recited in any of the claims and/or any elements described in this application, in any fashion, fall within the contemplated scope of the present embodiments and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for determining a system latency, the method comprising:
   detecting, by a display device, an input packet received from a user input device coupled to the display device that has been generated by the user input device in response to an input event received by the user input device;
   generating, by the display device, a first timestamp in response to detecting the input packet;
   detecting, by the display device, a change in one or more pixel values received from a computing device that is separate from the display device, wherein the one or more pixel values are associated with one or more target pixel locations within a display screen of the display device, and the change is caused by the input event;
   generating, by the display device, a second timestamp in response to detecting the change in the one or more pixel values; and
   determining, by the display device, the system latency based on the first timestamp and the second timestamp.

2. The computer-implemented method of claim 1, further comprising displaying information associated with the system latency to a user via a user interface.

3. The computer-implemented method of claim 1, wherein detecting the change in the one or more pixel values comprises detecting that the one or more pixel values have changed by at least a threshold amount.

4. The computer-implemented method of claim 1, further comprising determining an input latency associated with the user input device, wherein the system latency is further based on the input latency.

5. The computer-implemented method of claim 4, wherein the input latency comprises an amount of time between when the input event occurs and when the input packet is generated in response to the input event.

6. The computer-implemented method of claim 4, wherein the input latency comprises an estimated input latency associated with the user input device.

7. The computer-implemented method of claim 1, further comprising determining a display latency associated with the display device, wherein the system latency is further based on the display latency.

8. The computer-implemented method of claim 7, wherein the display latency comprises an amount of time between when the change in the one or more pixel values of the one or more target pixel locations is detected and when a corresponding photon event occurs on the display screen of the display device.

9. The computer-implemented method of claim 7, wherein the display latency comprises an estimated display latency based on a screen resolution and a refresh rate of the display device.

10. The computer-implemented method of claim 1, wherein the system latency is further based on an input latency and a display latency.

11. One or more non-transitory computer-readable media including instructions that, when executed by one or more processors, cause the one or more processors to determine a system latency by performing the steps of:

detecting, by a display device, an input packet received from a user input device coupled to the display device that has been generated by the user input device in response to an input event received by the user input device;

generating, by the display device, a first timestamp in response to detecting the input packet;

detecting, by the display device, a change in one or more pixel values received from a computing device that is separate from the display device, wherein the one or more pixel values are associated with one or more target pixel locations within a display screen of the display device, and the change is caused by the input event;

generating, by the display device, a second timestamp in response to detecting the change in the one or more pixel values; and determining, by the display device, the system latency based on the first timestamp and the second timestamp.

12. The one or more non-transitory computer-readable media of claim 11, further comprising displaying information associated with the system latency to a user via a user interface.

13. The one or more non-transitory computer-readable media of claim 11, wherein detecting the change in the one or more pixel values comprises detecting that the one or more pixel values have changed by at least a threshold amount.

14. The one or more non-transitory computer-readable media of claim 11, further comprising determining an input latency associated with the user input device, wherein the system latency is further based on the input latency.

15. The one or more non-transitory computer-readable media of claim 11, further comprising determining a display latency associated with the display device, wherein the system latency is further based on the display latency.

16. A display device, comprising:

a display screen; and a latency engine that determines a system latency by performing the steps of:

detecting, by a display device, an input packet received from a user input device coupled to the display device that has been generated by the user input device in response to an input event received by the user input device;

generating, by the display device, a first timestamp in response to detecting the input packet;

detecting, by the display device, a change in one or more pixel values received from a computing device that is separate from the display device, wherein the one or more pixel values are associated with one or more target pixel locations within a display screen of the display device, and the change is caused by the input event;

generating, by the display device, a second timestamp in response to detecting the change in the one or more pixel values; and determining, by the display device, the system latency based on the first timestamp and the second timestamp.

17. The display device of claim 16, wherein the latency engine performs the additional steps of determining an input latency associated with the user input device, wherein the user input device is directly connected to the display device.

18. The display device of claim 17, wherein the input latency comprises an amount of time between when the input event occurs and when the input packet is generated in response to the input event.

19. The display device of claim 16, wherein the latency engine performs the additional steps of determining a display latency associated with the display device, wherein the system latency is further based on the display latency.

20. The display device of claim 19, wherein the display latency comprises an estimated display latency based on a screen resolution and a refresh rate of the display device.

* * * * *